Dec. 30, 1924.

1,520,704

C. C. FARMER

PISTON PACKING

Filed Feb. 7, 1920

INVENTOR
CLYDE.C. FARMER
BY *Wm. M. Cady*
ATTORNEY

Patented Dec. 30, 1924.

1,520,704

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

PISTON PACKING.

Application filed February 7, 1920. Serial No. 356,894.

*To all whom it may concern:*

Be it known that I, CLYDE C. FARMER, a citizen of the United States, residing at Edgewood, in the county of Allegheny and State of Pennsylvania, have invented new and useful Improvements in Piston Packings, of which the following is a specification.

This invention relates to packing material, and more particularly to a packing material adapted to be employed in the manufacture of brake cylinder piston packing.

The packing commonly employed in brake cylinder pistons is made of leather formed to the well known hydraulic cup shape.

Leather being of a porous nature, it has been found necessary to fill the leather packing with a filler material, so as to prevent leakage of fluid past the same.

It is very desirable to lubricate the brake cylinder in order to reduce friction and wear of the packing but it is well known that the lubricant employed tends to destory the filler in the leather packing, so that in time the packing becomes porous and leaks.

In order to maintain the packing in serviceable condition, it is then necessary to remove same and again fill with filler material.

The filler material also tends to liquefy when heated sufficiently and since the temperature of the brake cylinder is often quite high, for instance, when in service in hot climates, the packing is liable to lose its filler by liquefication due to heat.

The principal object of my invention is to provide a packing material in which the above difficulties are avoided.

Figure 1:
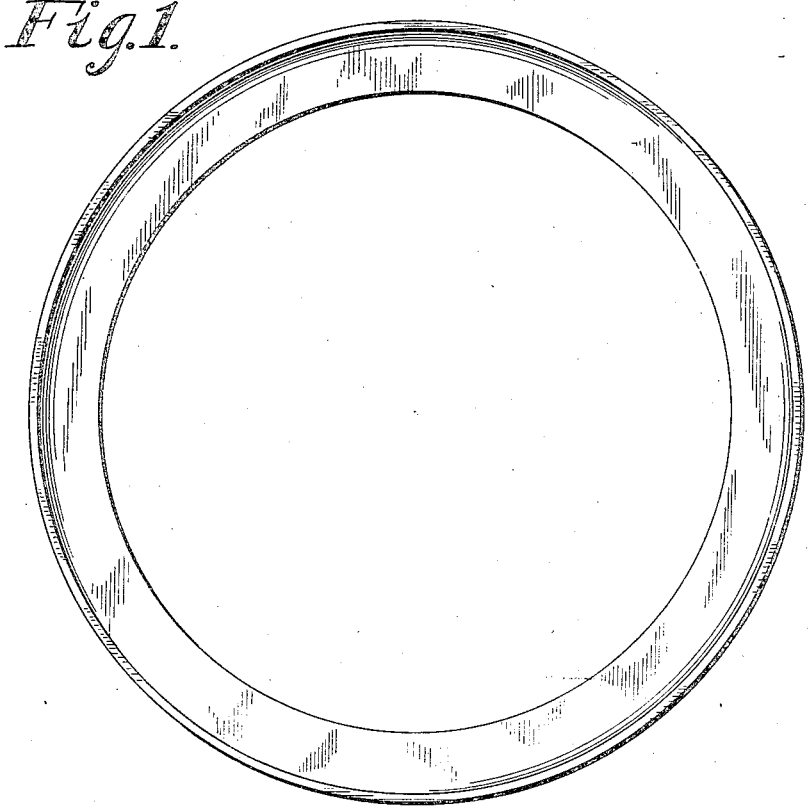
Figure 3:
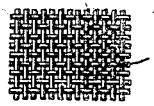
Figure 2:
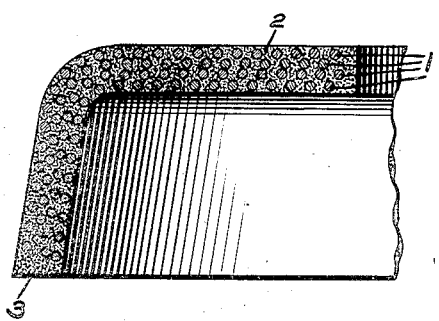

In the accompanying drawing, Fig. 1 is a face view of a brake cylinder piston packing constructed of packing material in accordance with my invention; Fig. 2 an enlarged transverse section of the piston packing; and Fig. 3 a view of a piece of the fabric employed in the packing.

Ordinary non-oil proof rubber would not be satisfactory for use in piston packing, since the lubricating oil necessarily employed in piston cylinders would soon disintegrate and destroy the packing and neither oil proof nor non-oil proof rubber would have the required strength to resist breaking unless a reinforcing material be included in the packing.

An oil proof rubber composition has been developed which is capable of withstanding the action of oil, such as lubricating oil, but it has been found upon test that such oil proof rubber composition is substantially non-adhesive that is to say, it will not form a reliable union with other substances, such as a fabric reinforcing material. On the other hand this oil proof rubber composition still retains the cohesive property of ordinary rubber, so that one portion of the material may be united with another portion.

With my invention I am enabled to employ oil proof rubber composition and at the same time provide a packing which is reinforced to resist wear and breakage and for this purpose I provide an open mesh fabric having on opposite sides a layer of oil proof rubber which is united through the meshes of the fabric.

A preferred method of making the packing material is to pass strips or sheets of open mesh fabric through calender rolls with strips of oil proof rubber composition applied to the opposite sides so that the rubber strips are calendered into and through the meshes of the fabric thus uniting the opposite strips of rubber through the meshes of the fabric.

The piston packing is then formed with as many layers of the packing material as are required to produce the desired thickness of the piston packing and placed in a mold pressure is applied to the mold so that the oil proof rubber composition of each layer unites with the rubber composition of adjacent layers.

The packing is then vulcanized in the mold, in the usual manner, to form the finished packing.

The packing so formed will then have a sectional appearance such as shown in Fig. 2, in which the layers of fabric 1 are embedded in and surrounded by oil proof rubber 2, forming a solid, homogeneous mass.

So as not to expose the ends of the fabric strands, the outer edge of the packing may be sealed with rubber, as shown at 3 of Fig. 2 of the drawing.

In the finished product, the threads or strands of the fabric are completely embedded in the rubber, leaving no open spaces.

A coarse mesh metal or other mineral fabric might be employed, but I prefer a vegetable fabric, such as cotton fabric.

A piston packing is thus produced which has the necessary strength to withstand destructive breakage and at the same time is not affected by oil or grease.

A packing may also be constructed of one or more layers of coarse mesh fabric with outside layers of oil proof rubber, but I prefer to make the packing as hereinbefore described. While the herein described packing material is designed more particularly for the manufacture of cup shaped piston packing as a substitute for the cup shaped leather packing heretofore employed as packing in connection with brake cylinder pistons in order to provide a strong and durable packing which will withstand the action of oil and particularly lubricating oil, it will be evident that the packing material may be employed in the manufacture of other packings, particularly where the packing may be subjected to the action of oil.

Having now described my invention, what I claim as new and desire to secure by Letters Patent, is:—

A cup-shaped piston packing ring comprising a plurality of united layers of packing material, each layer comprising a sheet of cotton fabric having coarse open meshes and sheets of oil proof rubber composition on opposite sides of the fabric and united through the meshes of the fabric.

In testimony whereof I have hereunto set my hand.

CLYDE C. FARMER.